United States Patent
Dubin et al.

(10) Patent No.: US 7,964,174 B2
(45) Date of Patent: Jun. 21, 2011

(54) NANOTUBE GROWTH AND DEVICE FORMATION

(75) Inventors: Valery M. Dubin, Portland, OR (US); Juan E. Dominguez, Hillsboro, OR (US); Chin-Chang Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 12/198,053

(22) Filed: Aug. 25, 2008

(65) Prior Publication Data

US 2008/0311400 A1   Dec. 18, 2008

Related U.S. Application Data

(62) Division of application No. 10/749,958, filed on Dec. 30, 2003, now abandoned.

(51) Int. Cl.
*C01B 31/02* (2006.01)

(52) U.S. Cl. .............. 423/445 B; 423/447.1; 423/447.3; 977/742

(58) Field of Classification Search .................. 423/445, 423/447.1–447.9; 977/742
See application file for complete search history.

(56) References Cited

U.S. PATENT DOCUMENTS

| | | | |
|---|---|---|---|
| 3,859,130 A | 1/1975 | Parker et al. |
| 6,333,016 B1 | 12/2001 | Resasco et al. |
| 6,413,487 B1 | 7/2002 | Resasco et al. |
| 6,737,939 B2 | 5/2004 | Hoppe et al. |
| 6,755,956 B2 | 6/2004 | Lee et al. |
| 6,838,354 B2 | 1/2005 | Goldberg et al. |
| 6,919,009 B2 | 7/2005 | Stonas et al. |
| 7,070,687 B2 | 7/2006 | Chikarmane et al. |
| 2005/0042369 A1 | 2/2005 | Mao et al. |
| 2005/0089467 A1 | 4/2005 | Grill et al. |

OTHER PUBLICATIONS

Dettlaff-Weglikowska et al., Chemical functionalization of single walled carbon nanotubes, 2002, Current Applied Physics, vol. 2, pp. 497-501.*
Suh et al., Linearly joined carbon nanotubes, 2001, vol. 123, pp. 381-383.*
Y. Li et al., Growth of Single-Walled Carbon Nanotubes from Discrete Catalytic Nanoparticles of Various Sizes, 2001, Journal of Physical Chemistry B, vol. 105, pp. 11424-11431.*
Avouris, Phaedon, et al., "Carbon Nanotube Electronics", 201st ECS Meeting, Philadelphia, PA, Abstract, May 13, 2002 , 52.
Chiu, P. W., et al., "Electrical Transport in metallofullerene nanotube peapods", 201st ECS Meeting—Philadelphia, PA, Abstract, May 16, 2002, 951.

(Continued)

*Primary Examiner* — Jerry Lorengo
*Assistant Examiner* — Jared Wood
(74) *Attorney, Agent, or Firm* — Blakely, Sokoloff, Taylor & Zafman LLP

(57) ABSTRACT

An apparatus and method for forming catalyst particles to grow nanotubes is disclosed. In addition, an apparatus and method for forming nanotubes using the catalytic particles is also disclosed. The particles formed may have different diameters depending upon how they are formed. Once formed, the particles are deposited on a substrate. Once deposited, the mobility of the particles is restricted and nanotubes and/or nanotube portions are grown on the particles. Nanotube portions having different diameters may be formed and the portions may be connected to form nanotubes with different diameters along the length of the nanotube.

11 Claims, 5 Drawing Sheets

OTHER PUBLICATIONS

Choi, G. S., et al., "Carbon nanotubes synthesized by Ni-assisted atmospheric pressure thermal chemical vapor deposition", *Journal of Applied Physics*, vol. 91, No. 6, Mar. 15, 2002, 3847-3854.

Gorbunov, A., et al., "Role of the catalyst particle size in the synthesis of single-wall carbon nanotubes", *Applied Surface Science*, 197-198, 2002, 563-567.

Grigorian, L., et al., "Transport Properties of alkali-metal-doped single-wall carbon nanotubes", *Physical Review B*, Rapid Communications, Third Series, vol. 58, No. 8, PRB 58, Aug. 15, 1998, R4195-R4197.

Kuznetsov, Vladimir L, et al., "Thermodynamic analysis of nucleation of carbon deposits on metal particles and its implications for the growth of carbon nanotubes", *Physical Review B*, vol. 64, American Physical Society 2001, 235401-1-235401-7.

Li, Jung, et al., "Growing Y-junction carbon nanotubes", *Nature*, vol. 402, Nov. 18, 1999, 253-254.

Martel, R., et al., "Single- and multi-wall carbon nanotube field-effect transistors", *Applied Physics Letters*, vol. 73, No. 17, 1998, American Institute of Physics, Oct. 26, 1998, 2447-2449.

Papadopoulos, C., et al., "Electronic transport in Y-Junction Carbon Nanotubes", *Physical Review Letters*, vol. 85, No. 16, American Physical Society, Oct. 16, 2000, 3476-3479.

Resasco, D. E., et al., "A scalable process for production of single-walled carbon nanotubes (SWNTs) by catalytic disproportionation of CO on a solid catalyst", *Journal of Nanoparticle Research 4*, accepted in revised form Sep. 17, 2001, 2002, 131-136.

Thess, Andreas, et al., "Crystalline Ropes of Metallic Carbon Nanotubes", *Science*, New Series, vol. 273, No. 5274, Jul. 26, 1996, Title p. 483-487.

Vossen, John L., et al., "Thin Film Processes", Academic Press, New York III-1. *Deposition of Inorganic Films from Solution* 1978, 212-218, 229-231.

* cited by examiner

NANOTUBE GROWTH AND DEVICE FORMATION

CROSS-REFERENCE TO RELATED APPLICATION

This application is a divisional of U.S. patent application Ser. No. 10/749,958, filed Dec. 30, 2003 now abandoned.

BACKGROUND

1. Field

Nanotubes and circuit devices.

2. Background

Nanotubes are generally seamless tubes of graphite sheets with full fullerene caps which were first discovered as multilayer concentric tubes or multi-walled carbon nanotubes and subsequently as single-walled nanotubes in the presence of transition metal catalysts. Nanotubes have shown promising applications in nanoscale electronic devices, high strength materials, electron field emission, tips for scanning probe microscopy and gas storage.

BRIEF DESCRIPTION OF THE DRAWINGS

Various embodiments are illustrated by way of example and not by way of limitation in the figures of the accompanying drawings in which like references indicate similar elements.

DETAILED DESCRIPTION

Figure 1:
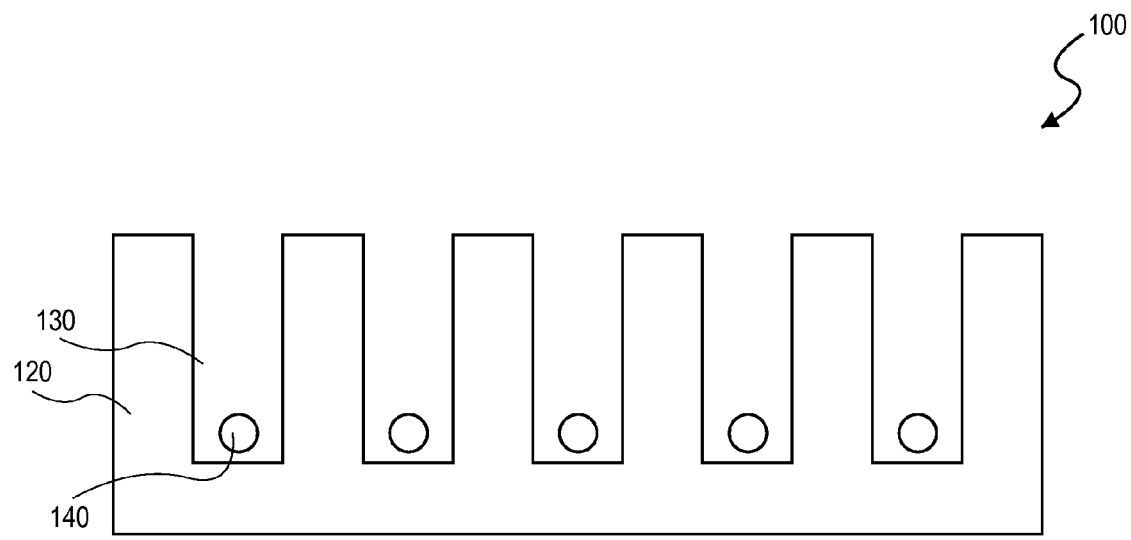
FIG. 1 shows one embodiment of a structure including vias for growing nanotubes.

One technique for forming catalytic metal particles is through a chemically-induced oxidation-reduction (REDOX) reaction, also referred to herein as an electroless plating.

In one embodiment a substrate is placed into a bath containing one or more metal ions to be plated or introduced onto the substrate; and one or more reducing agents to reduce the oxidation number of the metal ions. In one embodiment, the metal particles suitable as catalysts for nanotube formation are formed by an electroless process on a desired substrate. Representatively, suitable electroless metal particles may be generated using refractory, noble and/or transition metals introduced in an ionic state with a positive oxidation number. Since the metals are in an ionic state having a positive oxidation number, they are in a sense, nanotube catalyst material precursors.

One technique generates metal particles in a solution by mixing metal ions from Group VIII (e.g., Co, Ni, Rh, Ru, Pd, Ir, Pt, Fe, Os) and metal ions from Group VI (e.g., Cr, Mo, W). In one embodiment, the nanotube catalyst material includes an alloy of cobalt or nickel. Suitable cobalt or nickel alloys include, but are not limited to cobalt (Co), nickel (Ni), cobalt-ruthenium (CoRu), cobalt-rhodium (CoRh), nickel-palladium (NiPd), nickel-chromium (NiCr), cobalt-molybdenum (CoMo), cobalt-iridium (CoIr), cobalt-rhenium (CoRe), and cobalt-tungsten (CoW). The use of ternary alloys is also contemplated.

In terms of introducing metal ions of cobalt, metal ions (nanotube catalyst precursors) such as cobalt supplied by cobalt chloride, cobalt sulfate, etc., are introduced in a concentration range, in one embodiment, of about 10 grams per liter (g/l) to about 70 g/l, alone or with the addition of compound containing metal ions of a desired alloy constituent (e.g., Ni, Co, Cr, W, etc.). One example of a suitable additional compound is ammonium tungstate (for alloying with W). A suitable concentration range for the additional compound is about 0.1 g/l to about 10 g/l.

To introduce the metal particles onto a surface, such as a refractory material, exposed to the bath, the oxidation number of the introduced metal ions is reduced. To reduce the oxidation number of the metal ions, one or more reducing agents are included in the bath. In one embodiment, the reducing agents are selected to be alkaline metal-free reducing agents such as ammonium hypophosphite, dimethylamine borate (DMAB), borohydride, hydrazine, and/or glyoxylic acid in a concentration range of about two g/l to about 30 g/l. The bath may also include one or more alkaline metal-free chelating agents such as citric acid, malic acid, succinic acid, ammonium chloride, glycine, acetic acid, and/or malonic acid in the concentration range of about five g/l to about 70 g/l for, in one respect, complexing cobalt or a Group VIII metal. An alkaline metal-free pH adjuster such as ammonium hydroxide ($NH_4OH$), tetramethyl ammonium hydroxide (TMAH), tetraethyl ammonium hydroxide (TEAH), tetrapropyl ammonium hydroxide (TPAH), and/or tetrabutyl ammonium hydroxide (TBAH), may further be included in the bath to achieve a suitable pH range, such as a pH range of about three to about 14. A representative process temperature for an electroless plating bath such as described is on the order of about 40° C. to about 100° C.

As described, the chemically-induced REDOX reaction or electroless process introduces the nanotube catalyst particles on a surface of a substrate. In addition, the particles may be generated in the bulk of electroless plating bath.

In this embodiment, a desired substrate (e.g., $SiO_2$, $Al_2O_3$, carbon-doped (CDO), etc. with a porous or flat surface) is immersed into the electroless solution. Metal particles suitable as catalysts will be deposited on a surface of the substrate. In one embodiment, the substrate may be rinsed and/or dried after the substrate is removed from the solution.

Another embodiment includes dispensing an electroless bath with metal particles on the surface of a support substrate. In one embodiment, the substrate is rinsed and/or dried following dispensing of the electroless bath. Another embodiment includes extracting particles from the electroless bath by filtering the metal particles from the bath. In another embodiment, metal particles are extracted from the bath by centrifugation. Another technique for extracting the metal particles from an electroless bath includes evaporating the bath so that the metal particles remain.

In one embodiment, after a particle has been extracted, the particle is dispensed in a volatile liquid. In one embodiment, the volatile liquid is methanol or ethanol. The particle, in one embodiment, may optionally be exposed to a surfactant (e.g., Triton X-100) following being dispensed in the volatile liquid.

Another technique to remove a metal particle from a bath includes removing the particle using mechanical agitation. For example, mechanical agitation includes, but is not limited to, a megasonic technique, and an ultrasonic technique, a scrub in non-corrosive liquid media technique or any other mechanical agitation technique capable of removing a metal particle from the bath.

Another embodiment includes enhancing the affinity of the electroless particles to a substrate surface by pre-treating the surface to form a hydrophobic surface. Representatively, a hydrophobic surface of a refractory material may be created using a plasma or wet chemical treatment using a dilute acid (e.g., $H_2SO_4$, citric acid, nitric acid) and a TMAH-based alkaline cleaning solution.

Once metal particles are formed using any of the above-discussed methods, the particles may then, in one embodiment, have a nanotube formed on them. In addition, it is contemplated that the particles may be deposited on any substance and/or in any environment appropriate for nanotube formation on the particles.

FIG. 1 illustrates a cross-sectional, schematic side view of a portion of a structure including vias for growing nanotubes. Structure 100 includes substrate 120. Representatively, substrate 120 is a refractory material formed to a desired thickness, such that vias of a desired length, capable of growing a desired length of nanotube, may be etched into substrate 120.

In one embodiment, vias 130 are formed in substrate 120 by photolithography and etching. Vias 130, in one embodiment, may be formed to a diameter such that nanotubes of a desired diameter may be formed therein. In one embodiment, an aspect ratio of a via is selected to avoid molten metal out-diffusion via capillary effects and to have considerable dimensions for carbon nanotube nucleation and growth. A suitable aspect ratio, in one embodiment, is on the order of about 10:1 to about 10,000:1.

Representatively, a mask, such as a photoresist mask, may be used to define an area (e.g., a cross-sectional area) for via openings and then, in one embodiment, vias 130 may be etched with a suitable chemistry. In one embodiment, the mask may then be removed (such as by oxygen plasma to remove photoresist).

In one embodiment, vias 130 are formed using highly spatially resolved etching techniques. For example, vias 130 may be formed in alumina by an anodic oxidation of aluminum in acids, such as sulfuric acid ($H_2SO_4$), phosphoric acid ($H_3PO_4$), oxalic acid ($H_2C_2O_4$) or any other acid capable of forming vias 130 in alumina.

FIG. 1 also shows particles 140 in vias 130 (representatively, a particle at a base of each via). In one embodiment, vias 130 are each filled with a single particle 140. Vias 130, in another embodiment, may contain a plurality of particles 140.

Particles 140 are a material suitable as a catalyst for nanotube (e.g., carbon nanotube) growth. Representatively, particles 140 may be formed of any of the metals or alloys discussed above. Also, since nanotube diameter is generally dependant upon the size of the particle upon which the nanotube is formed (e.g., nanotubes with large diameters grow on large particles and nanotubes with small diameters grow on small particles), particles 140 may be formed to a desired size, such that nanotubes of a desired diameter may be formed on particles 140.

In one embodiment, particles 140 become deposited in vias 130 by immersing structure 100 into a bath containing particles 140. For example, an electroless plating of cobalt-tungsten (CoW) can be used in a solution containing Co ions; W ions; a complexing agent such as, for example, citric acid; a reducing agent such as, for example, hypophosphite; a buffer such as, for example, ammonium chloride; and a pH adjuster such as, for example, TMAH with a pH of about eight to about ten and at a temperature of about 50 C.° to about 90 C.°. Structure 100 is then, in one embodiment, immersed into this bath and particles 140 come to rest in vias 130.

Another technique for depositing particles 140 in vias 130 is to pour a bath containing particles 140 over structure 100, causing particles 140 to become deposited in vias 130. In another embodiment, particles 140 are deposited in vias 130 by using a pipette to place particles 140 into vias 130.

In another embodiment, particles 140 are deposited in vias 130 using a physical vapor deposition (PVD) technique. PVD techniques suitable for depositing particles 140 in vias 130 include, but are not limited to, vacuum evaporation, sputtering, molecular beam epitaxy or any other PVD process suitable for depositing particles 140 into vias 130.

Particles 140, in another embodiment, are deposited in vias 130 using a chemical vapor deposition (CVD) technique. Suitable CVD processes for depositing particles 140 into vias 130 include, but are not limited to atmospheric pressure CVD, low pressure CVD, plasma enhanced CVD or any other CVD process capable of depositing particles 140 into vias 130.

In one embodiment, to avoid having surface, instead of via, nanotube nucleation, any overlying metal is removed by polishing (e.g., chemical-mechanical polishing) the surface of substrate 120. In another embodiment, surface nucleation is avoided by depositing particles 140 on a patterned surface and exposing particles 140 to a high heat treatment of about 700° C. to about 1200° C. until each via 130 is filled by surface diffusion. Another technique for avoiding surface nucleation includes depositing particles by a PVD process followed by etching of the surface. This technique removes any particles 140 from the surface of substrate 120, while particles 140 within vias 130 remain.

Figure 2:
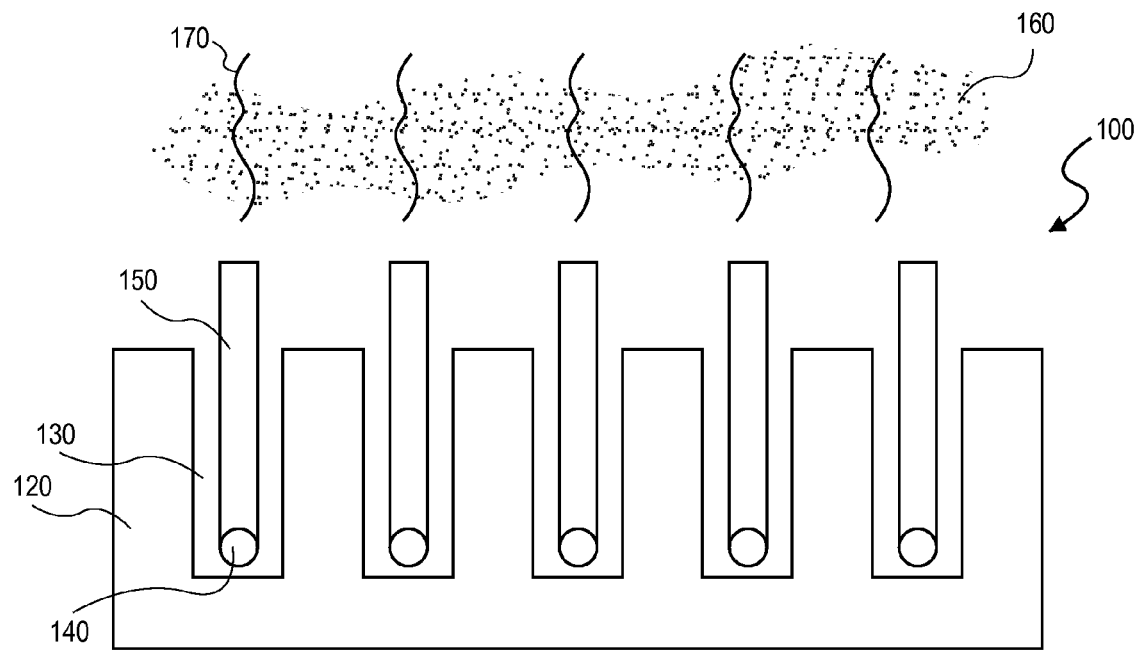
FIG. 2 shows the structure of FIG. 1 with nanotubes growing in the vias.

FIG. 2 shows structure 100 having nanotubes formed within vias 130. When particles 140 are deposited in vias 130, they are capable of serving as catalysts in the formation of nanotubes 150. Depositing particles 140 in vias 130 constrains particles 140 to a confined space. Being confined within vias 130 prevents surface diffusion and agglomeration of particles 140 at the temperatures required in the formation of nanotubes 150.

In one embodiment, after particles 140 are deposited within vias 130, structure 100 is exposed to a carbon-containing gas. Carbon-containing gas 160, in one embodiment, is carbon monoxide (CO). Other examples of suitable carbon-containing gases include, but are not limited to, carbon dioxide ($CO_2$), methane ($CH_4$) or any other gas containing sufficient amounts of carbon to encourage the formation of nanotubes 150 on particles 140.

One technique to encourage nanotubes 150 to grow on particles 140 includes exposing particles 140 to high temperatures while particles 140 are exposed to carbon-containing gas 160. In one embodiment, the temperature is in excess of 700 C.°.

Laser ablation is another technique that can be used to encourage nanotubes 150 to grow on particles 140. Using laser ablation, pulsed light from, for example, an excimer laser is focused onto a solid carbon target inside a vacuum chamber to "boil off" a plume of energetic carbon atoms off the carbon material. Particles 140 are positioned to intercept the plume of carbon atoms and will receive a thin film deposit of carbon from the carbon material from which nanotubes 150 form.

In one embodiment, an arc discharge technique is used to the temperatures needed to encourage nanotubes 150 to grow on particles 140 when exposed to carbon-containing gas 160. An arc discharge is a high power electrical discharge characterized by high current (tens to hundreds of amperes) and low voltage (a few volts to tens of volts) and a current-voltage (I-V) curve of negative slope. Confinement of an arc-welding discharge current to a small electrode surface yields extremely high current density and commensurately large Joule heating, producing a high temperature.

In one embodiment, structure 100 is exposed to an electric field while nanotubes 150 are forming. Electric field 170, in one embodiment, is in the range of about $10^4$ to about $10^6$ volts per centimeter (V/cm). In addition, electric field 170 may have any intensity that will affect the direction of growth of nanotubes.

Electric field 170, in one embodiment, influences the direction of growth of nanotubes 150. As illustrated in FIG. 2, electric field 170, in one embodiment, is aligned with vias 130 so that nanotubes 150 will grow, unobstructed, in the direction of electric field 170 within vias 130.

In one embodiment, electric field 170 is created by a sustainer capacitor. In addition, electric field 170 may be created by an other device capable of forming an electric field with an intensity that will affect the direction of growth of nanotubes 150.

In one embodiment, nanotubes 150 are carbon nanotubes. Nanotubes 150, in one embodiment, are single-walled carbon nanotubes. In another embodiment, nanotubes 150 are multi-walled carbon nanotubes.

Once formed, nanotubes 150 may be removed from vias 130 and, in one embodiment placed on a circuit device as a portion of a device. In another embodiment, nanotubes 150 may form an interconnect on a circuit device. It is contemplated that nanotubes 150 are appropriate for any nanotube application.

Figure 3:
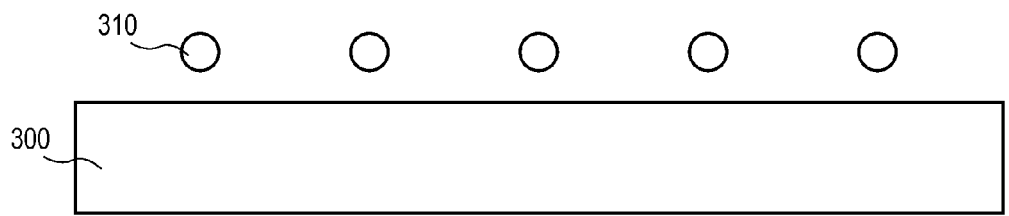
FIG. 3 shows another embodiment of a structure for growing nanotubes including a first portion with catalyst particles deposited on a surface of the first portion of structure.

FIGS. 3-6 show another embodiment of forming nanotubes. FIG. 3 shows a first portion of a structure having nanotube catalyst particles deposited thereon. Particles 310 may be deposited on first portion 300 of the structure using any of the techniques discussed above with reference to FIG. 1 regarding forming particles in vias 130 of structure 100. In addition, particles 310 may be any of the embodiments of particle 140 discussed above.

Figure 4:
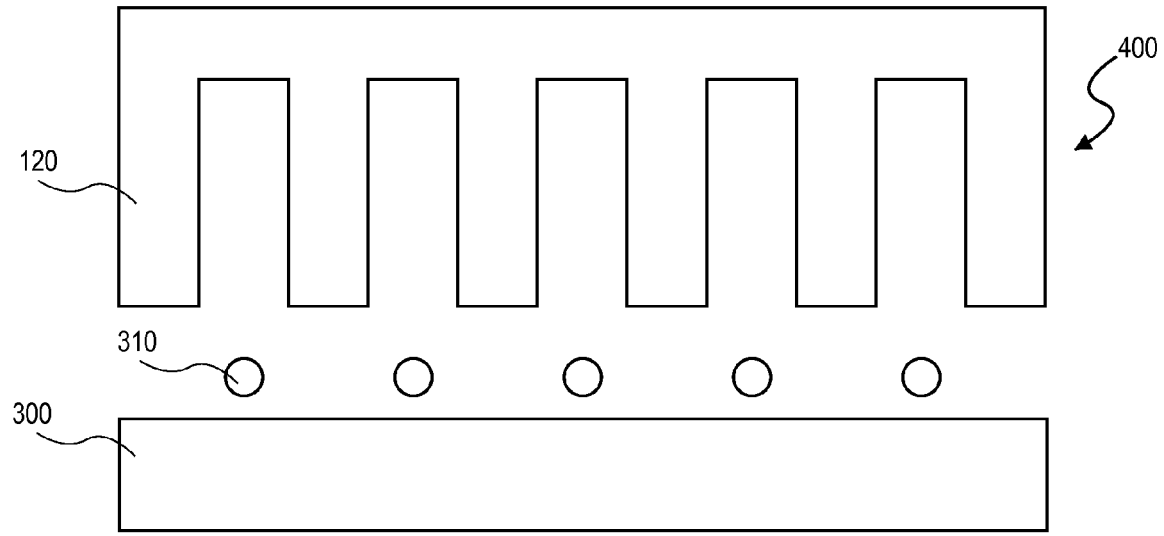
FIG. 4 shows the first portion of the structure of FIG. 3 prepared to be fused with a patterned second portion of the structure.

FIG. 4 shows the first portion of the structure of FIG. 3 prepared to be fused with a patterned second portion of the structure. Second portion 400 includes a plurality of vias 420. Second portion 400 may be formed similar to any of the embodiments of substrate 120 discussed above.

In one embodiment, vias 420 of second portion 400 are aligned with particles 310 such that particles 310 are reasonably centered within vias 420. When vias 420 and particles 310 are properly aligned, in one embodiment, portion 400 is fused to first portion 300 such that particles 310 are wholly encompassed by vias 420. Similar to above, particles 310, once encompassed by vias 420, have a restricted mobility.

Figure 5:
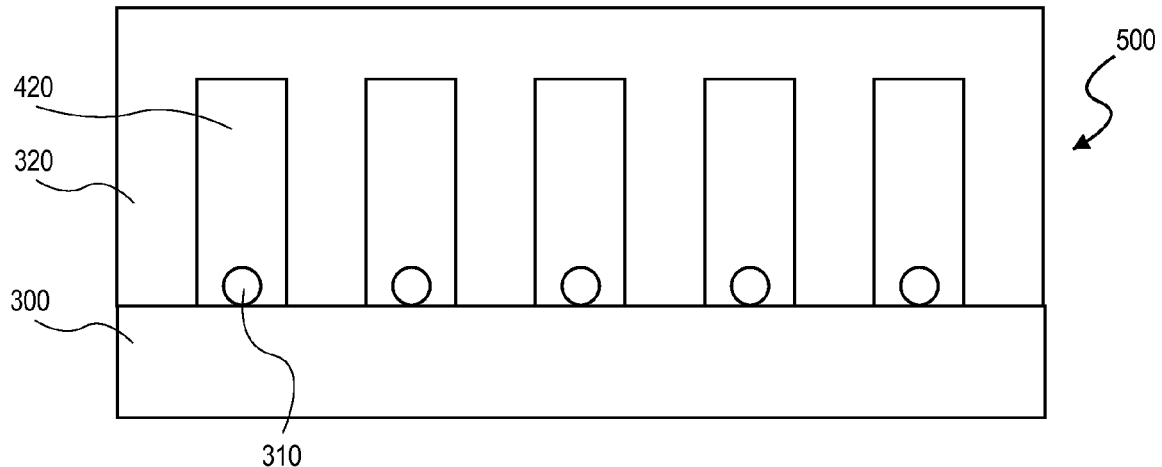
FIG. 5 shows the first portion and the second portion of the structure of FIG. 4 fused together to form the structure.

FIG. 5 shows the first portion and the second portion of the structure FIG. 4 fused together to form the structure. Portion 300 and portion 400, in one embodiment, are fused together by a heat treatment in the range of about 100° C. to about 700° C. to form structure 500. In addition, portions 300 and 400 may be fused together using any technique know in the art.

Figure 6:
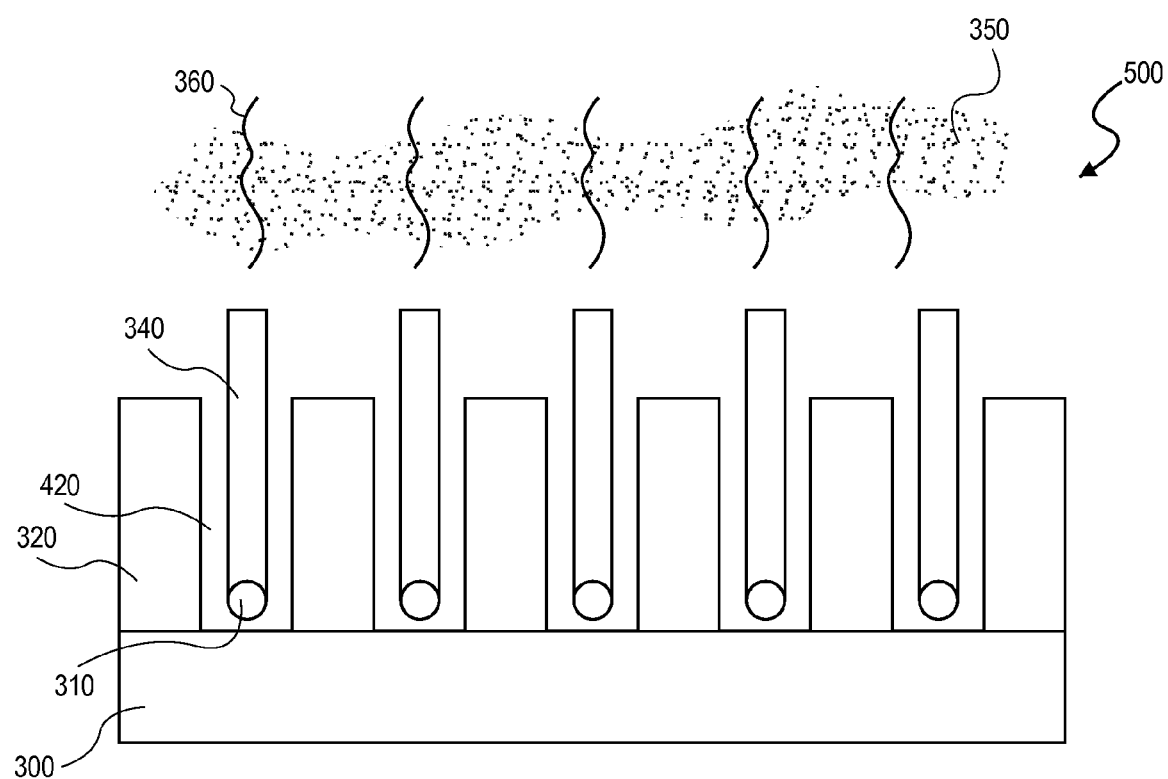
FIG. 6 shows the structure of FIG. 5 following removal of a portion of the second structure to define a number of vias and also shows nanotubes growing the vias.

FIG. 6 shows the structure of FIG. 5 following removal of a portion of second portion 400 to define a number of vias for growing nanotubes. The portion of portion 400, in one embodiment, may be removed using any technique (e.g., mechanical polishing) known in the art. When the portion of portion 400 is removed, vias 420 are prepared for the formation of nanotubes.

In one embodiment, after the portion of portion 400 has been removed, substrate 500 is exposed to a carbon-containing gas to encourage the growth of nanotubes 340 on particles 310. Carbon-containing gas 350 may be any of the embodiments of carbon-containing gas 160 discussed above.

One technique to encourage nanotubes 340 to grow on particles 310 includes exposing particles 310 to high temperatures while particles 310 are exposed to carbon-containing gas 350. In one embodiment, the temperature is in the range of about 200° C. to about 1000° C. One technique exposes particles 310 to a temperature in excess of 1000° C.

Another technique that may be used to encourage nanotubes 340 to grow on particles 310 is a laser ablation technique similar to the laser ablation technique discussed above. In one embodiment, an arc discharge technique similar to the arc discharge technique discussed above may be used to encourage nanotubes 340 to grow on particles 310.

In addition, similar to above, structure 500 may also be exposed to electric field 360 to affect the direction nanotubes 340 grow. Electric field 360 may be applied using any of methods discussed above with respect to electric field 170. In addition, electric field 360 may be any of the intensities discussed above with respect to electric field 170.

In one embodiment, nanotubes 340 are carbon nanotubes. Nanotubes 340, in one embodiment, are single-walled carbon nanotubes. In another embodiment, nanotubes 340 are multi-walled carbon nanotubes.

Once formed, nanotubes 340 may be removed from vias 420 and, in one embodiment placed on a circuit device as a portion of a device. In another embodiment, nanotubes 340 may form an interconnect on a circuit device. It is contemplated that nanotubes 340 are appropriate for any nanotube application.

Figure 7:
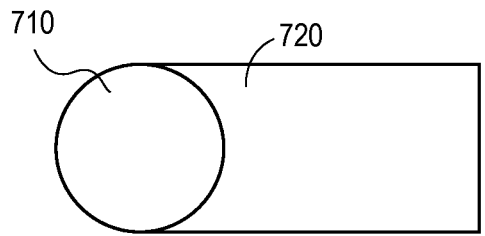
FIG. 7 shows one embodiment of a first portion of a nanotube formed on a catalytic particle.

FIG. 7 shows one embodiment of a first portion of a nanotube formed on a catalytic particle. Particle 710 may be formed of any of the materials discussed in the metal catalyst particle embodiments discussed above. In addition, particle 710 may be placed on a substrate using any of the embodiments discussed above.

In addition, since the diameter of particle 710 determines the diameter of nanotube portion 720, the size of particle 710 should be of a pre-determined size depending upon the desired dimensions of a composite nanotube structure. Moreover, appropriate modifications to the above-discussed vias (e.g., diameter and depth) should also be made to support the growth of a nanotube having a desired diameter size and length.

Portion 720 may be formed in particle 710 using any of the techniques for forming a nanotube discussed above. In one embodiment, once portion 720 is formed, particle 710 is dissolved using an acid. The acid, in one embodiment, is citric acid although any acid (e.g., HCl, $H_2SO_4$, etc.) capable of dissolving particle 710 while leaving portion 720 in tact may be used.

In one embodiment, once particle 710 is dissolved, particle 720 is given a surface charge. The surface charge is created on portion 720 by exposing portion 720 to either a carboxyl (COOH⁻) functional group or an amine (NH₂⁺) functional group.

Portion 720, in one embodiment, is then connected to particle 810 through a coulomb interaction (i.e., when carboxyl functional group molecules bond with amine functional group molecules). Using this technique, particle 810 is given a surface charge opposite of portion 720 by exposing particle 810 to either a carboxyl (COOH⁻) functional group or an amine (NH₂⁺) functional group. For example, if portion 720 is exposed to a carboxyl functional group creating a negative surface charge on portion 720, particle 810 should be exposed to an amine functional group to create a positive surface charge on particle 810, or vice versa.

Once portion 720 and particle 810 are attached, in one embodiment, portion 720 and particle 810 are deposited into a via. The via, in one embodiment, constrains the movement of portion 720 and particle 810 and portion 720 and particle 810 are exposed to a carbon nanotube formation process similar to any of the embodiments discussed above to encourage growth of a second nanotube portion.

In another embodiment, once portion 720 and particle 810 are attached, portion 720 and particle 810 are placed on a surface of a substrate to constrain the movement of portion 720 and particle 810. After deposition on the substrate, portion 720 and particle 810 are exposed to a carbon nanotube formation process similar to any of the embodiments discussed above to encourage growth of a second nanotube portion.

The carbon-containing gas, in one embodiment, is carbon monoxide (CO). Other examples of suitable carbon-containing gases include, but are not limited to, carbon dioxide ($CO_2$), methane ($CH_4$) or any other gas containing sufficient amounts of carbon to encourage the formation of a second nanotube on particle 810.

In one embodiment, portion 720 and particle 810 are exposed to a temperature in the range of about 400° C. to about 1200° C. while also being exposed to the carbon-containing gas. One technique exposes portion 720 and particle 810 to a temperature in excess of 1200° C. while being exposed to the carbon-containing gas.

Laser ablation similar to the embodiments discussed above may, in one embodiment, be used to encourage a second portion of nanotube to grow on particle 810. In another embodiment, an arc discharge technique similar to the technique discussed above may be used to encourage a second portion of nanotube to grow on particle 810.

Figure 8:
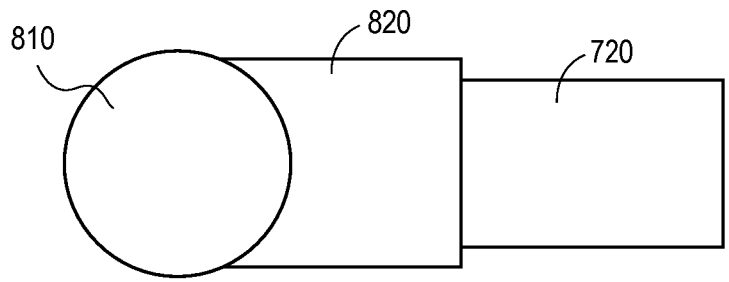
FIG. 8 shows the first portion of a nanotube in FIG. 7 connected to a second portion of a nanotube, the second portion grown on a second particle.

FIG. 8 shows a second portion of a nanotube formed on particle 810 and connected to first portion 720. While portion 720 and particle 810 are exposed to a nanotube formation process similar to any of the embodiments discussed above, second nanotube portion 820 begins to form on particle 810.

Second portion 820 forms between particle 810 and portion 720. The diameter of second portion 820 is dependent upon the size of particle 810. For example, FIG. 8 shows second portion 820 larger in diameter than portion 720. This is true because particle 810 in the embodiment shown in FIG. 8 has a larger diameter than particle 710, as shown in FIG. 7.

In another embodiment, second portion 820 has a smaller diameter than portion 720. In this embodiment, particle 810 would have a smaller diameter than particle 710. In another embodiment, portions 720 and 820 have the same diameter.

When second portion 820 starts to form on particle 810, second portion 820 forms between particle 810 and portion 720. As second portion 820 grows, portion 720 is "pushed" away from particle 810.

After second portion 820 reaches a desired length, particle 810 is dissolved using an acid. The acid, in one embodiment, is citric acid although any acid (e.g., HCl, $H_2SO_4$, etc.) capable of dissolving particle 810 while leaving portions 720 and 820 in tact may be used.

In one embodiment, after particle 810 is dissolved, portions 720 and 820 are connected to particle 910 through a condensation reaction similar to the techniques discussed above (e.g., through formation and reaction of COOH⁻ and NH₂⁺ functional groups). After portions 720 and 820 are attached to particle 920, in one embodiment, portions 720, 820 and particle 910 are deposited into a via using any of the techniques discussed above. After deposition into the via, in one embodiment, portions 720, 820 and particle 910 are exposed to a carbon nanotube formation process similar to any of the embodiments discussed above to encourage growth of a third nanotube portion on particle 910.

In another embodiment, once portions 720, 820 and particle 910 are attached, portions 720, 820 and particle 910 are placed on a surface of a substrate to constrain the movement of portions 720, 820 and particle 910. After deposition on the substrate, portions 720, 820 and particle 910 are exposed to a carbon nanotube formation process similar to any of the embodiments discussed above to encourage growth of a third nanotube portion on particle 910.

Figure 9:
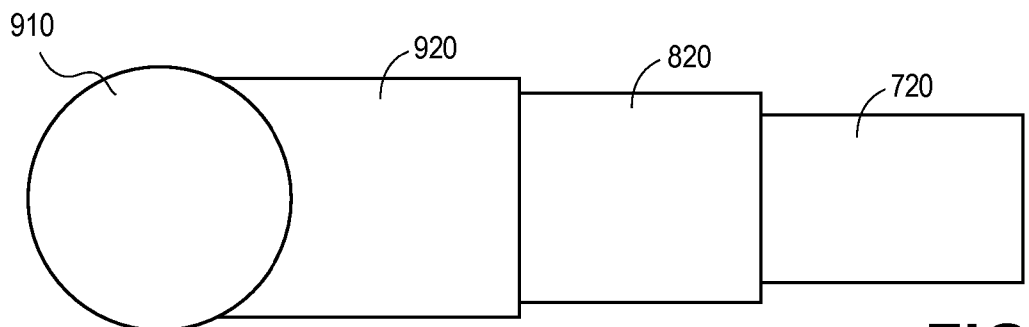
FIG. 9 shows the first portion and second portion of nanotubes shown in FIG. 8 connected to a third portion of a nanotube, the third portion grown on a third particle.

FIG. 9 shows a third portion of a nanotube formed on particle 910 and connected to portions 720 and 820. While portions 720, 820 and particle 910 are exposed to any of the embodiments of a nanotube forming process discussed above, third carbon nanotube portion 920 begins to form on particle 910.

Third portion 920 forms between particle 910 and portion 820. The diameter of third portion 920 is dependent upon the size of particle 910. For example, FIG. 9 shows third portion 920 larger in diameter than portions 820 and 720. This is true because particle 910 in the embodiment shown in FIG. 9 has a larger diameter than particles 810 and 710, as shown in FIG. 7 and FIG. 8.

In another embodiment, third portion 920 has a smaller diameter than portions 820 and 720. In this embodiment, particle 910 would have a smaller diameter than particles 810 and 710. In another embodiments the portions form a carbon nanotube with portion diameters of the same and/or different diameters arranged in any order (e.g., small/medium/large, large/small/large, medium/medium/medium, etc.).

When third portion 920 starts to form on particle 910, third portion 920 forms between particle 910 and second portion 820. As third portion 920 grows, portions 820 and 720 are "pushed" away from particle 910. Other embodiments may repeat this process of dissolving the particle, attaching the composite nanotube structure to a new particle, and forming a new portion of nanotube between the new particle and composite nanotube structure may be repeated until a desired length and/or diameter size combination is reached.

Figure 10:
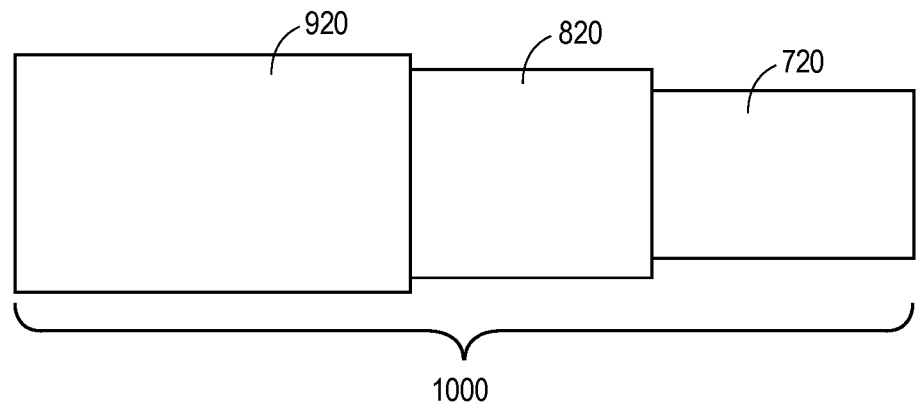
FIG. 10 shows the first portion, second portion and third portion of nanotubes shown in FIG. 9 forming a composite nanotube structure.

FIG. 10 shows a composite nanotube formed of the portion of FIG. 9. After third portion 920 reaches a desired length, particle 910 is dissolved using an acid. The acid, in one embodiment, is citric acid although any acid (e.g., HCl, $H_2SO_4$, etc.) capable of dissolving particle 910 while leaving portions 720, 820 and 920 in tact may be used. After particle 910 is dissolved, portions 720, 820 and 920, in one embodiment, form composite nanotube 1000.

In one embodiment, portions 720, 820 and 920 are carbon nanotube portions. Portions 720, 820 and 920, in one embodiment, are single walled carbon nanotube portions. In another embodiment, portions 720, 820 and 920 are multi-walled carbon nanotube portions.

In addition, nanotube 1000, in one embodiment, is a carbon nanotube. Nanotube 1000, in one embodiment, is a single-walled carbon nanotube. In another embodiment, nanotube 1000 is a multi-walled carbon nanotube.

In one embodiment, nanotube 1000 includes both single-walled and multi-walled portions. In another embodiment, nanotube 1000 includes a combination of single-walled portions and multi-walled portions, in addition to a combination of diameter sizes. For example, nanotube may be formed of a large, single-walled portion connected to a small, multi-walled portion, or formed of a small, single-walled portion connected to a medium, multi-walled portion connected to a large, single-walled portion, etc. Alternatively, each portion of a composite nanotube (e.g., nanotube 1000) may be a single-walled portion or a multi-walled portion.

Once formed, nanotube 1000 may, in one embodiment, be placed on a circuit device as a portion of a device. In another embodiment, nanotube 1000 may form an interconnect on a circuit device. It is contemplated that nanotube 1000 is appropriate for any nanotube application.

In addition, any subset of nanotube 1000 (e.g., portions 720 and 820, portions 920 and 820, portion 720, etc.) is capable of forming a portion of a circuit device or forming an interconnect on a circuit device. Moreover, it is contemplated that any subset of nanotube 1000 is also appropriate for any nanotube application.

Figure 11:
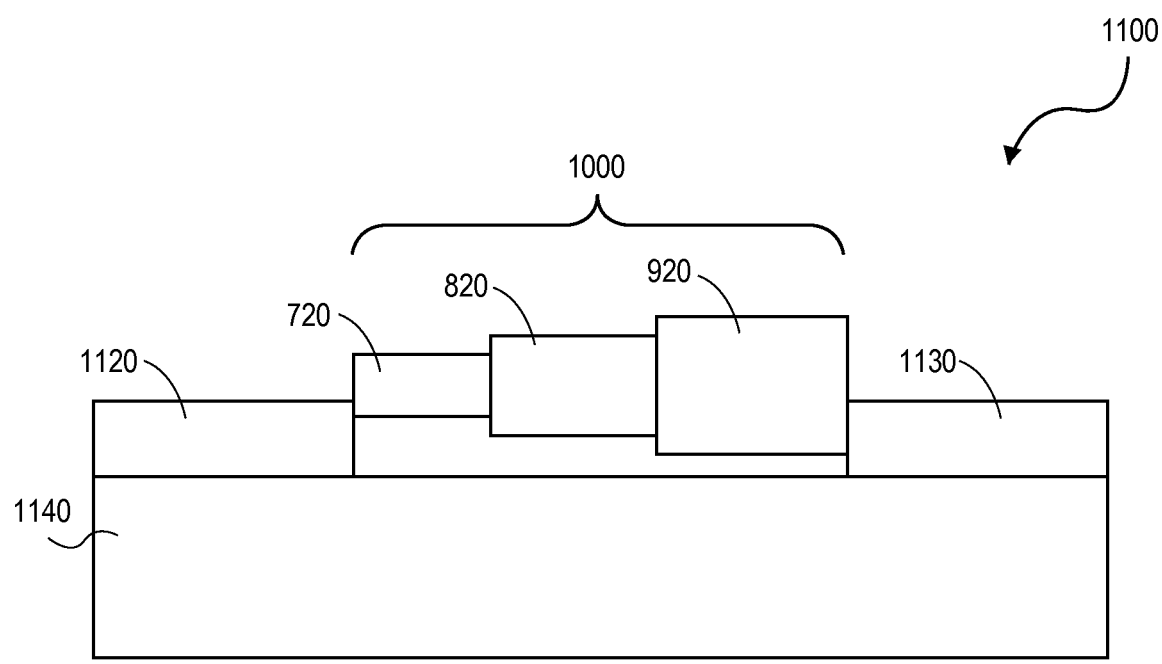
FIG. 11 shows one embodiment of a heterojunction device containing the composite nanotube structure of FIG. 10.

FIG. 11 shows a circuit device including the nanotube shown in FIG. 10. Device 1100, in one embodiment, is heterojunction transistor. As shown in FIG. 11, device 1100 includes nanotube 1000 forming an electrode between source 1120 and drain 1130 on substrate 1140. In another embodiment, device 1100 is a diode. It is contemplated that device 1100 may form any circuit device which is capable of using a nanotube.

In the foregoing specification, embodiments of the invention have been described with reference to specific embodiments thereof. It will, however, be evident that various modifications and changes can be made thereto without departing from the broader spirit and scope of embodiments of the invention as set forth in the appended claims. The specification and drawings are, accordingly, to be regarded in an illustrative rather than a restrictive sense.

We claim:

1. A method, comprising:
    forming a first portion of a nanotube with a first diameter;
    after forming the first portion, attaching the first portion of a nanotube to a particle; and
    after attaching, forming a second portion of the nanotube with a second diameter on the particle coupled to the first portion of the nanotube.

2. The method of claim 1, wherein the diameter of the first portion and the second portion are different.

3. The method of claim 1, wherein the particle comprises a second particle and forming the first portion occurs on a first metal particle of a first size.

4. The method of claim 3, wherein forming the second particle comprises a second metal particle of a second size.

5. The method of claim 4, wherein the first and second particles are different sizes.

6. The method of claim 4, wherein attaching the first particles to the second portion comprises:
    dissolving the first particle; and
    exposing the first portion to a first one of an amine functional group and a carboxyl functional group.

7. The method of claim 6, further comprising:
    wherein the one of an amino functional group and a carboxyl functional group is one of a first amine functional group and a carboxyl group exposing the second particle to a second one of an amine functional and a carboxyl functional group, the second one of an amine functional and a carboxyl functional group being the opposite of the first one of an amine functional and a carboxyl functional group.

8. A method comprising:
    exposing a first nanotube portion to one of a carboxyl functional group and an amine functional group;
    exposing a particle to the other of a carboxyl functional group and an amine functional group;
    attaching the first nanotube portion to the particle; and
    forming a second nanotube portion on the particle and coupled to the first nanotube portion, the first portion and second portion collectively defining a composite nanotube.

9. The method of claim 8, further comprising after forming the second nanotube portion, dissolving the particle.

10. The method of claim 9, further comprising:
    after dissolving the particle, exposing the composite nanotube to one of a carboxyl functional group and an amine functional group;
    exposing a second particle to the other of a carboxyl functional group and an amine functional group;
    attaching the composite nanotube to the second particle; and
    forming a third nanotube portion on the particle and coupled to the composite nanotube.

11. The method of claim 8, wherein the first nanotube portion and the second nanotube portion have different diameters.

* * * * *